(12) United States Patent
Ko et al.

(10) Patent No.: US 9,676,393 B2
(45) Date of Patent: Jun. 13, 2017

(54) SYSTEM AND METHOD FOR DETECTING ENVIRONMENT-INDUCED DISABLEMENT OF ADVANCED DRIVER ASSISTANCE SYSTEM

(71) Applicant: AUTOMOTIVE RESEARCH & TEST CENTER, Changhua County (TW)

(72) Inventors: Ming-Kuan Ko, Changhua County (TW); Shun-Hung Chen, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 364 days.

(21) Appl. No.: 14/584,060

(22) Filed: Dec. 29, 2014

(65) Prior Publication Data
US 2016/0185357 A1 Jun. 30, 2016

(51) Int. Cl.
*G01C 22/00* (2006.01)
*B60W 50/04* (2006.01)
*B60Q 9/00* (2006.01)
*G01S 13/93* (2006.01)
*G01S 13/86* (2006.01)

(52) U.S. Cl.
CPC ............. *B60W 50/04* (2013.01); *B60Q 9/00* (2013.01); *G01S 13/931* (2013.01); *G01S 13/865* (2013.01); *G01S 13/867* (2013.01); *G01S 2013/9353* (2013.01); *G01S 2013/9357* (2013.01)

(58) Field of Classification Search
CPC ........ B60Q 9/00; B60W 50/04; G01S 13/865; G01S 13/867
See application file for complete search history.

(56) References Cited

U.S. PATENT DOCUMENTS

2008/0059024 A1* 3/2008 Hara ................... B60R 16/0231
701/36
2013/0332028 A1* 12/2013 Heger ................... B60Q 1/085
701/36

(Continued)

FOREIGN PATENT DOCUMENTS

| CN | 101204957 A | 6/2008 |
| TW | 1306816 B | 3/2009 |

*Primary Examiner* — Redhwan k Mawari
(74) *Attorney, Agent, or Firm* — Rosenberg, Klein & Lee (57) ABSTRACT

The present invention discloses a system and method for detecting environment-induced disablement of ADAS. The system comprises a rainfall detector, a fog detector and a temperature/humidity detector respectively generating a rainfall value, a fog value, and a temperature/humidity value; a processor electrically connected with these detectors, using the rainfall value and fog value to generate a rainfall-fog value, using the fog value and temperature/humidity value to generate a snowfall value, using a fuzzy computation to process the rainfall-fog value and snowfall value to generate an output value, and emitting an alert signal if the output value exceeds a preset output value; and an automatic driver assistance device electrically connected with the processor, receiving the alert signal, and determining whether to stop automatic driving according to the alert signal. The present invention will alerts ADAS of the disablement lest ADAS execute wrong control actions.

13 Claims, 6 Drawing Sheets

(56) References Cited

U.S. PATENT DOCUMENTS

| | | | | |
|---|---|---|---|---|
| 2014/0300479 A1* | 10/2014 | Wolter | ................ | B60W 50/14 340/576 |
| 2014/0354210 A1* | 12/2014 | Seo | ................ | H02P 29/024 318/798 |
| 2015/0281430 A1* | 10/2015 | Cho | ................ | H04M 1/72569 455/418 |
| 2016/0185357 A1* | 6/2016 | Ko | ................ | B60W 50/04 701/23 |

* cited by examiner

SYSTEM AND METHOD FOR DETECTING ENVIRONMENT-INDUCED DISABLEMENT OF ADVANCED DRIVER ASSISTANCE SYSTEM

BACKGROUND OF THE INVENTION

Field of the Invention

The present invention relates to a driver assistance technology, particularly to a system and method for detecting environment-induced disablement of an advanced driver assistance system.

Description of the Related Art

The advanced driver assistance system (ADAS) is one of the intelligent vehicle technologies the automobile manufacturers are enthusiastic to develop, expected to realize unmanned vehicles in future. ADAS assists drivers to drive/control vehicles, enhancing safety of drivers and traffic. ADAS normally uses image sensors, millimeter-wave radars or laser radars to detect the distance between a vehicle and a barrier so as to generate a vehicle control signal.

Environmental factors are likely to affect image sensors, millimeter-wave radars or laser radars of the conventional ADAS, impair the judgement of ADAS, and make ADAS fail to control the vehicle correctly. If the weather factor or road state causes a vehicle to slip, ADAS would be hard to control the direction of the vehicle. In some worse cases, a slipping vehicle may endanger the driver and others.

Accordingly, the present invention proposes a system and method for detecting environment-induced disablement of ADAS to overcome the abovementioned problems.

SUMMARY OF THE INVENTION

The primary objective of the present invention is to provide a system and method for detecting environment-induced disablement of an advanced driver assistance system (ADAS), which judges influences of the external environment factors on ADAS, whereby ADAS can determine the reliability of the cameras and detection radars thereof according to the judgement, wherefore ADAS is exempted from incorrect information and less likely to execute wrong control actions.

Another objective of the present invention is to provide a system and method for detecting environment-induced disablement of ADAS, which detects the slippage rate of a vehicle and informs ADAS of the slippage rate, whereby ADAS stops driving the vehicle while the slippage is too severe lest the slipping vehicle cause a traffic accident.

In order to achieve the abovementioned objectives, the present invention proposes a system for detecting environment-induced disablement of ADAS, which comprises at least one environment sensor detecting the environment and generating at least one detection result; a processor electrically connected with the environment sensor and using a fuzzy computation to process the detection result and generate an output value and emitting an alert signal if the output value exceeding a preset output value; and an automatic driver assistance device electrically connected with the processor, receiving the alert signal from the processor, and determining whether to stop automatic driving according to the alert signal.

The present invention also proposes a method for detecting environment-induced disablement of ADAS, which comprises steps: detecting the environment to acquire a rainfall value, a fog value and a temperature/humidity value; a processor using the rainfall value and the fog value to generate a rainfall-fog value and using the fog value and the temperature/humidity value to generate a snowfall value; the processor using a fuzzy computation to process the rainfall-fog value and the snowfall value and generate an output value; the processor determining whether the output value is greater than a preset output value; if no, the process returning to the step of detecting the environment to acquire a rainfall value, a fog value and a temperature/humidity value; if yes, the processor generating an alert signal to an automatic driver assistance device; the automatic driver assistance device determining whether to stop automatic driving according to the alert signal.

Below, embodiments are described in detail to make easily understood the objectives, technical contents, characteristics and accomplishments of the present invention.

DETAILED DESCRIPTION OF THE INVENTION

Figure 1:
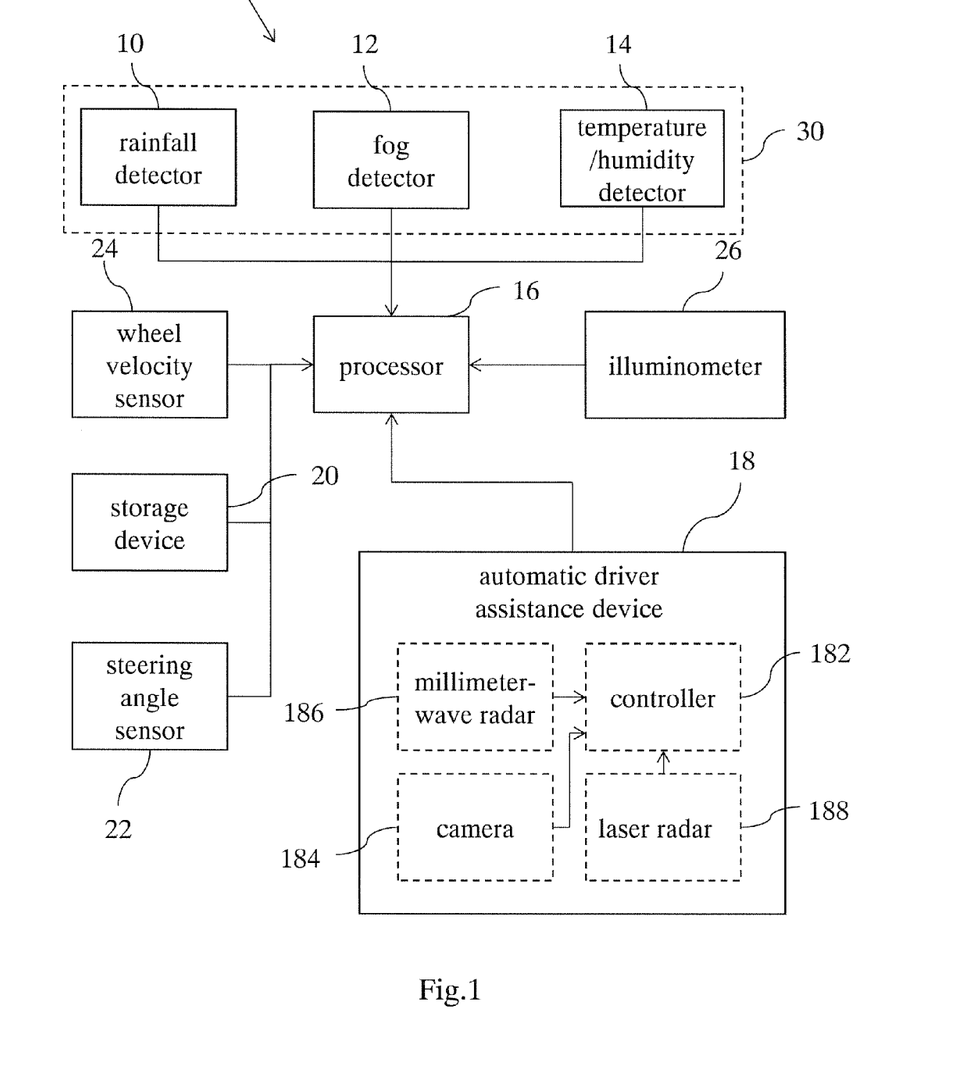
FIG. 1 is a block diagram schematically showing a system for detecting environment-induced disablement of ADAS according to one embodiment of the present invention.

Refer to FIG. 1 a block diagram schematically showing a system for detecting environment-induced disablement of ADAS according to one embodiment of the present invention. The system 1 of the present invention comprises an environment detection device 30, a processor 16 and an automatic driver assistance device 18. The environment detection device 30 includes a rainfall detector 10, a fog detector 12, and a temperature/humidity detector 14. The rainfall detector 10 detects the rainfall of the environment and generates a rainfall value. The fog detector 12 detects the fog of the environment and generates a fog value. The temperature/humidity detector 14 detects the temperature/humidity of the environment and generates a temperature/humidity value. The processor 16 is electrically connected with the rainfall detector 10, the fog detector 12 and the temperature/humidity detector 14 and receives the rainfall value, the fog value and the temperature/humidity value therefrom. The processor 16 generates a rainfall-fog value according to the rainfall value and the fog value and generates a snowfall value according to the fog value and the temperature/humidity value. Then, the processor 16 uses a fuzzy computation to process the rainfall-fog value and the snowfall value to generate an output value. The processor 16 determines whether the output value is greater than a preset output value. If the output value is greater than the preset output value, the processor 16 generates an alert signal to the automatic driver assistance device 18. In such a case, the automatic driver assistance device 18 determines whether to stop automatic driving according to the alert signal. The automatic driver assistance device 18 includes a controller 182, a camera 184, a millimeter-wave radar 186, and a laser radar 188, wherein the camera 184, the millimeter-wave radar 186 and the laser radar 188 are electrically connected with the controller 182. According to the image signal of the camera 184, the millimeter-wave radar signal of the millimeter-wave radar 186 and the laser radar signal of the laser radar 188, the controller 182 generates a vehicle-control signal to assist in driving the vehicle. The controller 182 determines whether to stop generating the vehicle-control signal as soon as receiving the alert signal from the processor 16.

A deduction database is built using a plurality of reference rainfall values, a plurality of reference fog values, and a plurality of reference temperature/humidity values respectively acquired by the rainfall detector 10, the fog detector 12, and the temperature/humidity detector 14, and the variations of the signals of the camera 184, the millimeter-wave radar 186, and the laser radar 188. The processor 16 uses the fuzzy computation and the deduction database to generate the output value.

Besides, the processor 16 is further electrically connected with a storage device 20, a steering angle sensor 22, and a wheel velocity sensor 24. The storage device 20 stores a slippage judgement equation. The processor 16 acquires the angular velocity of wheel from the steering angle sensor 22, acquires the center velocity of wheel and rotation radius of wheel from the wheel velocity sensor 24, and then substitutes them into the slippage judgement equation to generate a slippage value. If the processor 16 determines that the slippage value is greater than a preset slippage value, the processor 16 generates a slippage alert to the controller 182 of the automatic driver assistance device 18. Once receiving the slippage alert, the controller 182 of the automatic driver assistance device 18 stops generating vehicle control signals. The processor 16 is also electrically connected with an illuminometer 26 generating an illumination value. If the process 16 determines that the illumination value is below a preset output value, the processor 16 generates an illumination alert to the controller 182 of the automatic driver assistance device 18 to inform the controller 182 that the illumination is too weak for the camera 184 to capture clear images. In such a case, the controller 182 would not generate vehicle control signals because the camera 184 cannot send image signals to the controller 182.

Figure 2:
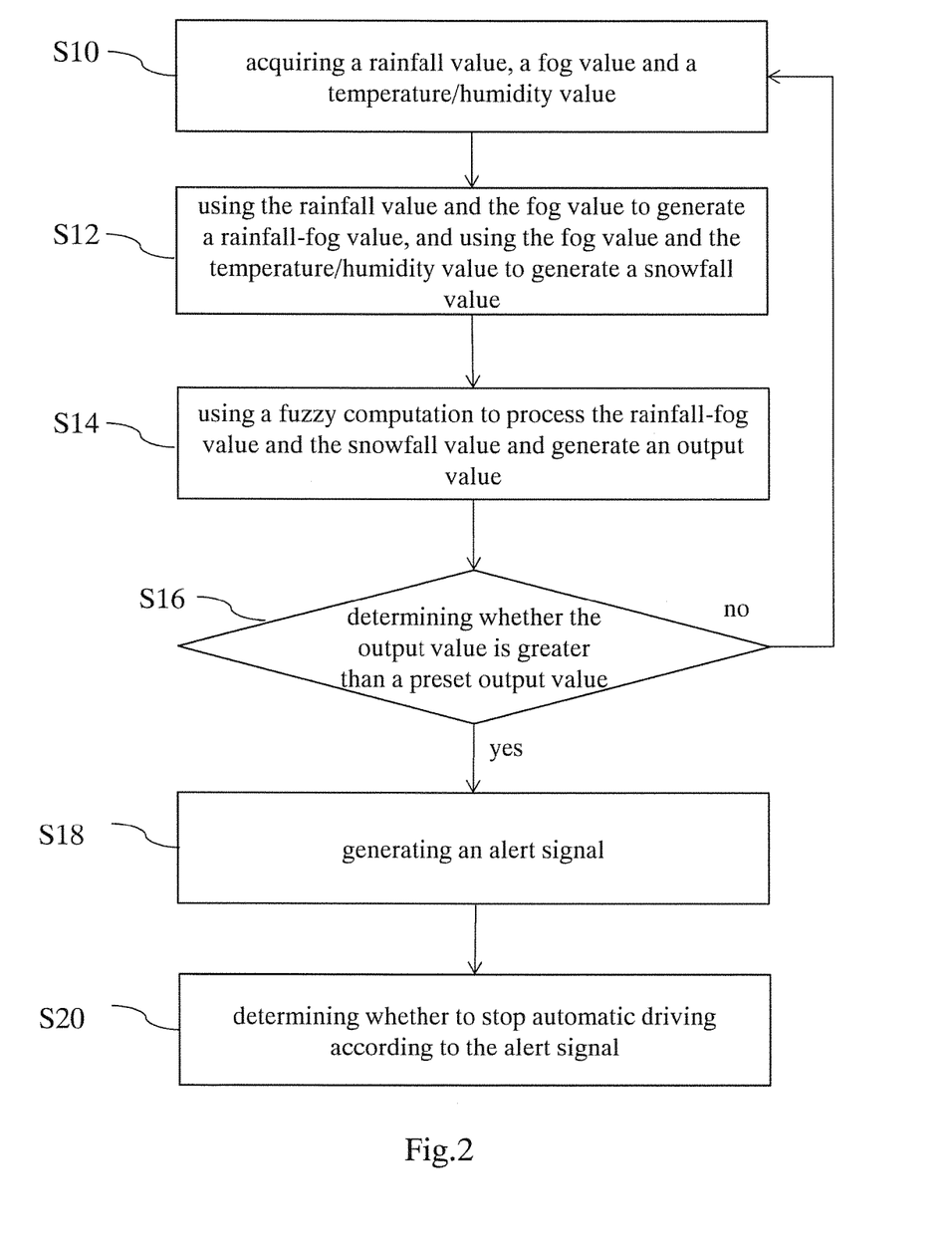
FIG. 2 is a flowchart of a method for detecting environment-induced disablement of ADAS according to one embodiment of the present invention.
Figure 3:
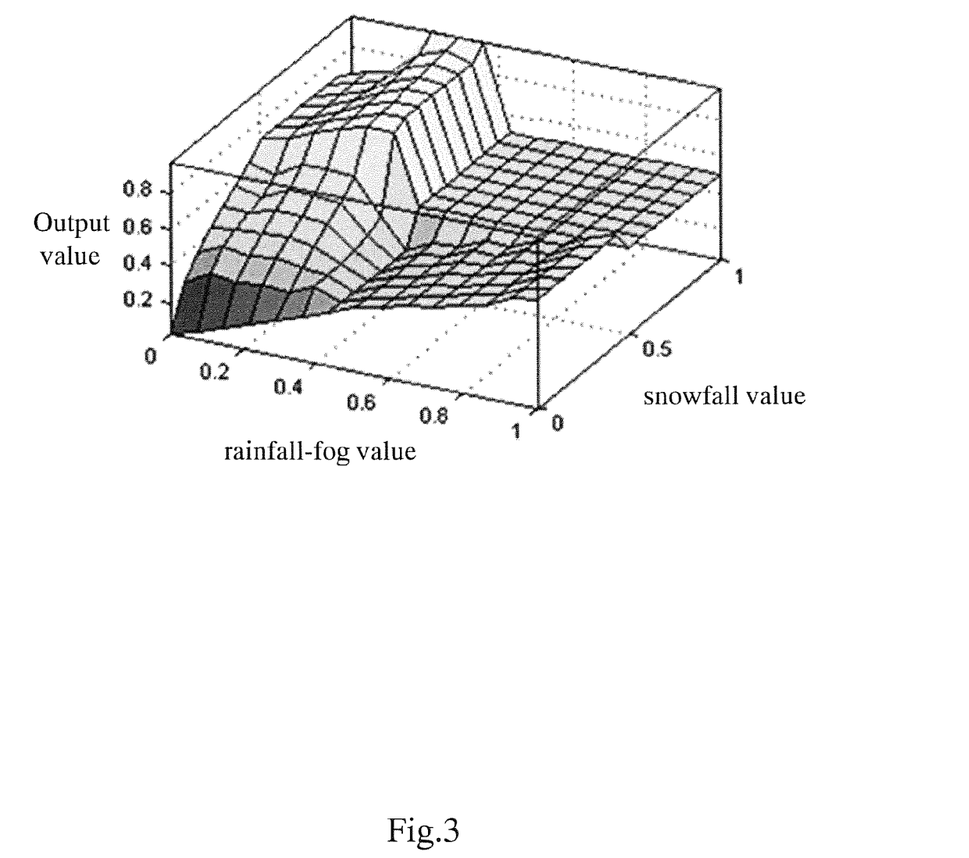
FIG. 3 is a diagram schematically showing a lookup list of output values according to one embodiment of the present invention.

The architecture of the system of the present invention has been described hereinbefore. The process of the method of the present invention will be described thereinafter. Refer to FIG. 2 showing a flowchart of a method for detecting environment-induced disablement of ADAS, and refer to FIG. 1 again. In Step S10, respectively acquire a rainfall value, a fog value and a temperature/humidity value via a rainfall detector 10, a fog detector 12 and a temperature/humidity detector 14. In Step S12, a processor 16 generates a rainfall-fog value according to the rainfall value and the fog value and generates a snowfall value according to the fog value and the temperature/humidity value. In Step S14, the processor 16 uses a fuzzy computation to process the rainfall-fog value and the snowfall value to generate an output value. In order to carry out the fuzzy computation, the rainfall detector 10, the fog detector 12 and the temperature/humidity detector 14 respectively acquire a plurality of reference rainfall values, a plurality of reference fog values, and a plurality of reference temperature/humidity values. According to the rainfall values and the fog values, the processor 16 generates at least 9 rainfall-fog values, including rainless-fogless, light rain-fogless, heavy rain-fogless, rainless-thin fog, light rain-thin fog, heavy rain-thin fog, rainless-thick fog, light rain-thick fog, and heavy rain-thick fog. According to the fog value and temperature/humidity value, the processor 16 generates a snowfall value. The rainfall-fog values are integrated with the snowfall values to output the following 13 combinations: rainless-fogless-snowless, light rain-fogless-snowless, heavy rain-fogless-snowless, rainless-thin fog-snowless, light rain-thin for-snowless, heavy rain-thin fog-snowless, rainless-thick fog-snowless, light rain-thick fog-snowless, heavy rain-thick fog-snowless, rainless-fogless-light snow, rainless-thin fog-light snow, and rainless-thick fog-heavy snow. The output combinations are integrated with the information of the variations of the signals of the camera 184, the millimeter-wave radar 186, and the laser radar 188 to build a deduction database (a lookup list), which is presented in form of the curved surface shown in FIG. 3. Thus, the processor 16 can look up the corresponding point in the curved surface and find out a preset output value according to the intersection point of the rainfall-fog value and the snowfall value acquired through the rainfall detector 10, the fog detector 12, and the temperature/humidity detector 14.

After the preset output value is obtained, the process proceeds to Step S16. In Step S16, the processor 16 determines whether the output value is over the preset output value. If the output value is not over the preset output value, the process returns to Step S10. If the output value is over the preset output value, the process proceeds to Step S18. In Step S18, the processor 16 generates an alert signal. Next, the process proceeds to Step S20. In Step S20, the automatic driver assistance device 18 determines whether to stop automatic driving according the alert signal.

Figure 4:
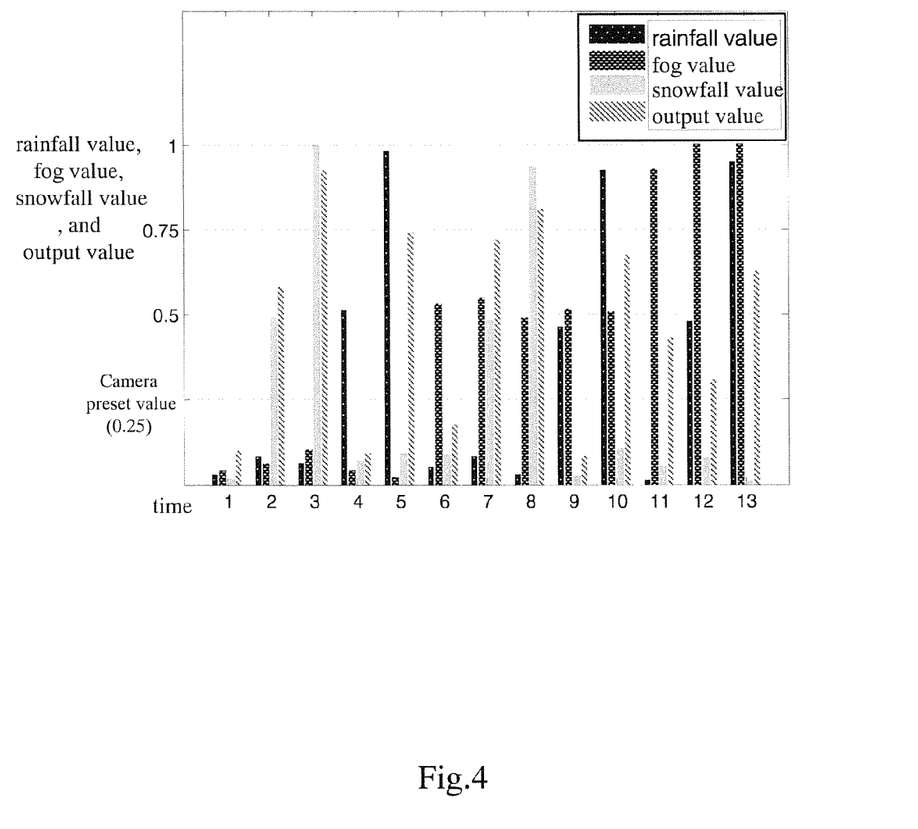
FIG. 4 shows a table to verify validness of a camera according to one embodiment of the present invention.

The output value generated by the processor 16 is also used to evaluate the validness of the camera 184, the millimeter-wave radar 186, and the laser radar 188. The evaluation process is described below. Firstly, the camera preset value, the millimeter-wave radar preset value and the laser radar preset value are established in the processor 16 beforehand for evaluating the validness of the camera 184, the millimeter-wave radar 186. The preset value is established according to the quality and performance of the device and the robustness of the algorithm thereof. Refer to FIG. 4. In evaluating the validness of the camera 184, the processor 16 determines whether the output value generated in Step S14 is over a camera preset value. In one embodiment, the camera preset value is set to be 0.25. The output values at the time points 2, 3, 5, 7, 8, 11, 12 and 13 all exceed 0.25. Thus, at these time points, the processor 16 generates a camera alert signal to the controller 182 of the automatic driver assistance device 18 to inform the controller 182 that the camera 184 is unable to generate image signals. Heavy rain, thick fog or heavy snow may disturb the lens of the camera 184 and hinder the camera 184 from capturing clear images.

Figure 5:
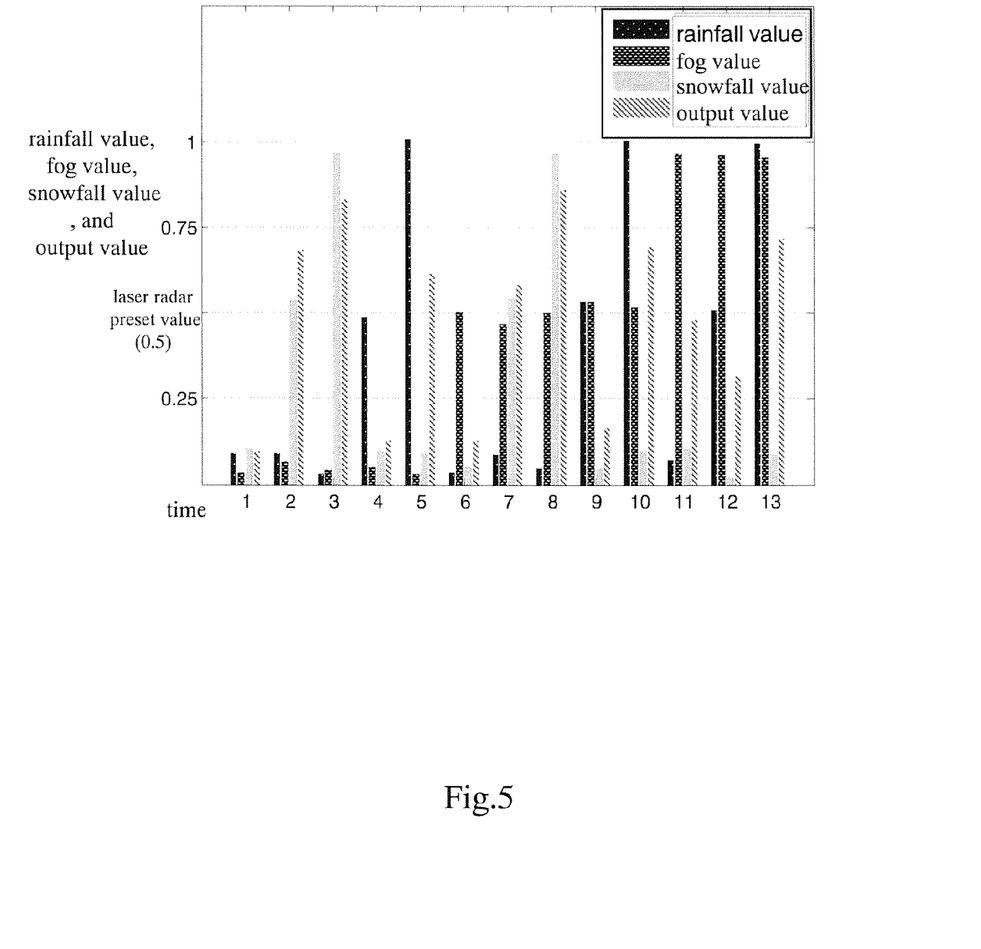
FIG. 5 shows a table to verify validness of a laser radar according to one embodiment of the present invention.

In evaluating the validness of the laser radar 188, the processor 16 determines whether the output value generated in Step S14 is over the laser radar preset value. Refer to FIG. 5. In one embodiment, the laser radar preset value is set to be 0.5. The output values at the time points 2, 3, 5, 7, 8, 10 and 13 all exceed 0.5. Thus, at these time points, the processor 16 generates a laser radar alert signal to the controller 182 of the automatic driver assistance device 18 to inform the controller 182 that the laser radar 188 is unable to generate laser radar signals. At present, heavy rain, thick fog or heavy snow may impair function of the laser radar 188 and hinder the laser radar from generating correct laser radar signals.

Figure 6:
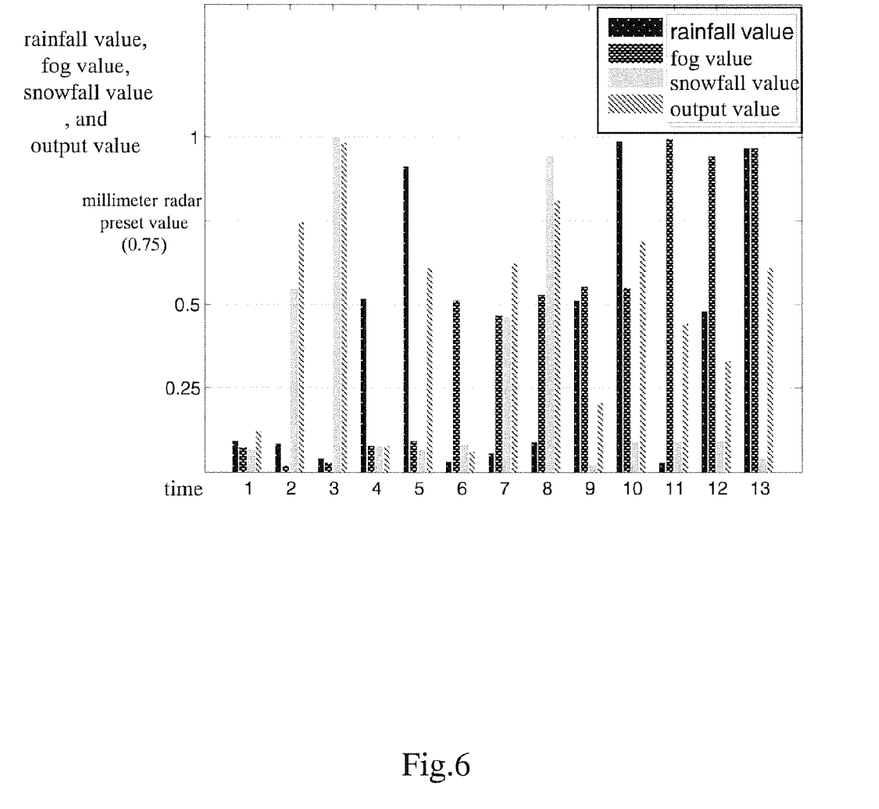
FIG. 6 shows a table to verify validness of a millimeter-wave radar according to one embodiment of the present invention.

In evaluating the validness of the millimeter-wave radar 186, the processor 16 determines whether the output value generated in Step S14 is over the millimeter-wave radar preset value. Refer to FIG. 6. In one embodiment, the millimeter-wave radar preset value is set to be 0.75. The output values at the time points 3 and 8 all exceed 0.75. Thus, at these time points, the processor 16 generates a millimeter-wave radar alert signal to the controller 182 of the automatic driver assistance device 18 to inform the controller 182 that the millimeter-wave radar 186 is unable to generate millimeter-wave radar signals. Heavy rain, thick fog or heavy snow may impair function of the laser radar 188 and hinder the millimeter-wave radar 186 from generating correct millimeter-wave radar signals.

In addition to using the output value to impalement the determination of whether the driver assistance device 18 continues generating vehicle control signals, the processor 16 further generates a slippage value in the following process: the processor 16 acquires the angular velocity of wheel from the steering angle sensor 22, acquires the central velocity of wheel and rotation radius of wheel from the wheel velocity sensor 24, and then substitutes them into the slippage judgement equation to generate a slippage value. The processor 16 determines whether the slippage value is greater a preset slippage value. If the processor 16 determines that the slippage value is greater than the preset slippage value, the processor 16 generates a slippage alert to the controller 182 of the automatic driver assistance device 18. The slippage value over the preset slippage value indicates the vehicle slips severely. If the vehicle keeps running in such a case, it may cause a traffic accident. Therefore, on receiving the slippage alert, the controller 182 of the automatic driver assistance device 18 should stop automatic driving to avoid a traffic accident. The slippage judgement equation is expressed as $$S=(v-wr)/v\times 100\%$$

wherein v is the center velocity (m/s) of wheel, w is the angular velocity (rad/s) of wheel, and r is the rotation radius (m) of wheel.

The processor 16 also determines whether an illumination value detected by the illuminometer 26 is below a preset illumination value. If the illumination value is below the preset illumination value, the process 16 generates an illumination alert to the controller 182 of the automatic driver assistance device 18 to inform the controller 182 that the illumination is too low for the camera 184 to capture clear images and that the camera 184 is unable to generate image signals to the controller 182. In such a case, the controller 182 does not generate vehicle control signals based on the image signals of the camera 184.

In conclusion, the present invention can judge the influences of the external environment on ADAS and determine the reliability of the information provided by the cameras or radars of thereof to avoid receiving incorrect information from the cameras or radars operating in a low-reliability state. Therefore, the present invention can prevent ADAS from making erroneous determinations and exempt the vehicle from a traffic accident. Further, the present invention can judge the slippage of the vehicle and inform ADAS of the slippage to prevent the vehicle from keeping running in severe slippage and causing a traffic accident.

The embodiments described above are only to exemplify the present invention but not to limit the scope of the present invention. Any equivalent modification or variation according to the characteristics or spirit of the present invention is to be also included within the scope of the present invention.

What is claimed is:

1. A system for detecting environment-induced disablement of an advanced driver assistance system, comprising:
   at least one environment detection device detecting external environment and generating at least one environment detection value, said environment detection device including a rainfall detector, a fog detector and a temperature/humidity detector, wherein said rainfall detector generates a rainfall value; said fog detector generates a fog value; said temperature/humidity detector generates a temperature/humidity value;
   a processor electrically connected with said environment detection device, using said environment detection value and a fuzzy computation to generate an output value, and generating an alert signal if said output value is over a preset output value, wherein said processor uses said rainfall value and said fog value to generate a rainfall-fog value and uses said fog value and said temperature/humidity value to generate a snowfall value; and wherein said processor uses said fuzzy computation to process said rainfall-fog value and said snowfall value to generate said output value; and
   an automatic driver assistance device electrically connected with said processor, receiving said alert signal, and determining whether to stop automatic driving according to said alert signal.

2. The system for detecting environment-induced disablement of an advanced driver assistance system according to claim 1, wherein said processor is further electrically connected with a storage device, a steering angle sensor, and a wheel center velocity sensor, and wherein said storage device stores a slippage judgement equation, and wherein said steering angle sensor acquires an angular velocity of wheel, and wherein said wheel center velocity sensor acquires a center velocity of wheel and a rotation radius of wheel, wherein said processor substitutes said angular velocity of wheel, said center velocity of wheel, and said rotation radius of wheel into said slippage judgement equation to acquire a slippage value, wherein said processor determines whether said slippage value is over a preset slippage value; if said slippage value is over said preset slippage value, said processor generates a slippage alert to said automatic driver assistance device to enable said automatic driver assistance device to stop automatic driving.

3. The system for detecting environment-induced disablement of an advanced driver assistance system according to claim 2, wherein said slippage judgement equation is expressed as $$S=(v-wr)/v\times 100\%$$

wherein v is said center velocity (m/s) of wheel, w is said angular velocity (rad/s) of wheel, and r is said rotation radius (m) of wheel.

4. The system for detecting environment-induced disablement of an advanced driver assistance system according to claim 1, wherein said automatic driver assistance device further comprises:
   a camera generating an image signal;
   a millimeter-wave radar generating a millimeter-wave radar signal;
   a laser radar generating a laser radar signal; and
   a controller electrically connected with said camera, said millimeter-wave radar, and said laser radar, and generating a vehicle control signal according to said image signal, said millimeter-wave radar signal and said laser radar signal.

5. The system for detecting environment-induced disablement of an advanced driver assistance system according to claim 4, wherein said processor is further electrically connected with an illuminometer generating an illumination value, and wherein said processor determines whether said illumination value is below a preset illumination value, and wherein if said illumination value is below said preset illumination value, said processor generates an illumination alert to said controller to inform said controller that said camera is unable to generate said image signal.

6. The system for detecting environment-induced disablement of an advanced driver assistance system according to claim 4, wherein said processor determines whether said output value is over a camera preset value; if said output value is over said camera preset value, said processor generates a camera alert signal to said controller of said automatic driver assistance device to inform said controller that said camera is unable to generate said image signal; said processor determines whether said output value is over a millimeter-wave radar preset value; if said output value is over said millimeter-wave radar preset value, said processor generates a millimeter-wave radar alert signal to said controller of said automatic driver assistance device to inform said controller that said millimeter-wave radar is unable to generate said millimeter-wave radar signal; said processor determines whether said output value is over a laser radar preset value; if said output value is over said laser radar preset value, said processor generates a laser radar alert signal to said controller of said automatic driver assistance device to inform said controller that said laser radar is unable to generate said laser radar signal.

7. The system for detecting environment-induced disablement of an advanced driver assistance system according to claim 4, wherein said fuzzy computation uses a plurality of reference rainfall value, a plurality of reference fog values and a plurality of reference temperature/humidity values, which are respectively collected by said rainfall detector, said fog detector and said temperature/humidity detector, and information of variations of said camera, said millimeter-wave radar and said laser radar to build a deduction database, and wherein said processor generates said preset output value according to said deduction database.

8. A method for detecting environment-induced disablement of an advanced driver assistance system, comprising
Step (A): detecting an environment to acquire a rainfall value, a fog value and a temperature/humidity value;
Step (B): a processor using said rainfall value and said fog value to generate a rainfall-fog value, and using said fog value and said temperature/humidity value to generate a snowfall value;
Step (C): said processor using a fuzzy computation to process said rainfall-fog value and said snowfall value to generate an output value;
Step (D): determining whether said output value is over a preset output value;
if no, returning to Step (A);
if yes, generating an alert signal, and then undertaking Step (E); and
Step (E): an automatic driver assistance device determining whether to stop automatic driving according to said alert signal.

9. The method for detecting environment-induced disablement of an advanced driver assistance system according to claim 8 further comprising steps: a detection device acquiring an angular velocity of wheel, a center velocity of wheel, and a rotation radius of wheel; said processor substituting said angular velocity of wheel, said center velocity of wheel, and said rotation radius of wheel into a slippage judgement equation to generate a slippage value; said processor determining whether said slippage value is over a preset slippage value; if yes, said processor generating a slippage alert to said automatic driver assistance device to enable said automatic driver assistance system to stop automatic driving.

10. The method for detecting environment-induced disablement of an advanced driver assistance system according to claim 9, wherein said slippage judgement equation is expressed as $$S=(v-wr)/v \times 100\%$$

wherein v is said center velocity (m/s) of wheel, w is said angular velocity (rad/s) of wheel, and r is said rotation radius (m) of wheel.

11. The method for detecting environment-induced disablement of an advanced driver assistance system according to claim 9 further comprising steps: detecting an illumination value; said processor determining whether said illumination value is below a preset illumination value; if yes, said processor generating an illumination alert signal to said automatic driver assistance device to inform said automatic driver assistance device that a camera of said automatic driver assistance device is unable to generate an image signal.

12. The method for detecting environment-induced disablement of an advanced driver assistance system according to claim 8 further comprising steps: said processor determining whether said output value is over a camera preset value; if yes, said processor generating a camera alert signal to said automatic driver assistance device to inform said automatic driver assistance device that a camera of said automatic driver assistance device is unable to generate an image signal; said processor determining whether said output value is over a millimeter-wave radar preset value; if said output value is over said millimeter-wave radar preset value, said processor generating a millimeter-wave radar alert signal to said automatic driver assistance device to inform said automatic driver assistance device that a millimeter-wave radar of said automatic driver assistance device is unable to generate a millimeter-wave radar signal; said processor determining whether said output value is over a laser radar preset value; if said output value is over said laser radar preset value, said processor generating a laser radar alert signal to said automatic driver assistance device to inform said automatic driver assistance device that a laser radar of said automatic driver assistance device is unable to generate a laser radar signal.

13. The method for detecting environment-induced disablement of an advanced driver assistance system according to claim 12, wherein said fuzzy computation uses a plurality of reference rainfall values, a plurality of reference fog values, a plurality of reference temperature/humidity values and information of variations of said camera, said millimeter-wave radar and said laser radar to build a deduction database, and wherein said processor generates said preset output value according to said deduction database.

* * * * *